United States Patent
Chen

(10) Patent No.: US 7,358,949 B2
(45) Date of Patent: Apr. 15, 2008

(54) LIQUID CRYSTAL DISPLAY DEVICE PIXEL AND DRIVE CIRCUIT

(75) Inventor: Ching-Chuan Chen, Taipei (TW)

(73) Assignee: Au Optronics Corp., Hsinchu (TW)

( * ) Notice: Subject to any disclaimer, the term of this patent is extended or adjusted under 35 U.S.C. 154(b) by 684 days.

(21) Appl. No.: 10/785,099

(22) Filed: Feb. 25, 2004

(65) Prior Publication Data

US 2005/0185108 A1 Aug. 25, 2005

(51) Int. Cl.
*G09G 3/36* (2006.01)
*G02F 1/1343* (2006.01)
*G02F 1/136* (2006.01)

(52) U.S. Cl. .............................. 345/92; 349/38; 349/42

(58) Field of Classification Search .......... 345/87–102, 345/204; 349/38–39, 41–42
See application file for complete search history.

(56) References Cited

U.S. PATENT DOCUMENTS 5,835,170 A * 11/1998 Fujiwara et al. .............. 349/38
7,109,958 B1 * 9/2006 Martin ......................... 345/87
2004/0119673 A1 * 6/2004 Park ............................ 345/87
2004/0135751 A1 * 7/2004 Kwon et al. .................. 345/87

FOREIGN PATENT DOCUMENTS

JP 06-130345 5/1994
JP 2002-118522 4/2002

* cited by examiner

*Primary Examiner*—Amr A. Awad
*Assistant Examiner*—Stephen G Sherman
(74) *Attorney, Agent, or Firm*—Thomas, Kayden, Horstemeyer & Risley

(57) ABSTRACT

A liquid crystal display device that comprises a plurality of gate lines formed in parallel to each other, a plurality of source lines formed in parallel to each other and orthogonal to the gate lines, an array of cells formed in rows and columns, each of the cells being formed near an intersection of one of the gate lines and one of the source lines, a first transistor of each of the cells disposed at an N-th row and M-th column, N and M being integers, driven by an (N-2)-th gate line, and a second transistor of the each of the cells driven by an N-th gate line.

19 Claims, 7 Drawing Sheets

LIQUID CRYSTAL DISPLAY DEVICE PIXEL AND DRIVE CIRCUIT

FIELD OF THE INVENTION

The present invention relates in general to a liquid crystal display ("LCD") device and, more particularly, to a drive circuit and a drive method for a thin film transistor liquid crystal display ("TFTLCD") device.

BACKGROUND OF THE INVENTION

A thin film transistor liquid crystal display ("TFTLCD") device in the art generally includes a drive circuit and an array of cells driven by the drive circuit. The drive circuit may further include a plurality of gate lines formed in parallel to each other and a plurality of source lines formed orthogonal to the gate lines. Each of the cells, disposed near an intersection of one of the gate lines and one of the source lines, includes a thin film transistor ("TFT") and a storage capacitor ($C_S$). The TFT further includes a gate coupled to a corresponding gate line and a source terminal coupled to a corresponding source line. A $C_S$-on-gate type TFT in the art refers to a TFT to which a corresponding $C_S$ is formed between a source terminal of the TFT and a previous gate line.

FIG. 1A is a schematic diagram of a $C_S$-on-gate type TFTLCD 10 in the art. An exemplary cell 12 of TFTLCD 10 includes a TFT 14 and a storage capacitor 16. TFT 14 includes a gate 14-2 coupled to an n-th gate line $G_n$, a drain terminal 14-4 coupled to an m-th source line $S_m$, and a source terminal 14-6 which serves as one electrode of storage capacitor 16. The source and drain are interchangeable in a TFT. The other electrode 16-2 of storage capacitor 16 is coupled to a previous gate line $G_{n-1}$. Cell 12 may further include another capacitor 18 formed between source terminal 14-6 and a common electrode (not numbered).

FIGS. 1B and 1C are waveform diagrams of TFTLCD 10 shown in FIG. 1A. Referring to FIG. 1C, when the gate line $G_{n-1}$ is selected, i.e., $V(G_{n-1})$ is logically high, the potential of source terminal 14-6 or $V_{16}$ is pulled high from a reference voltage level. When the selection period of the gate line $G_{n-1}$ is concluded and $V(G_{n-1})$ becomes logically low, $V_{16}$ is pulled low to the reference voltage level. Next, when the gate line $G_n$ is selected and $V(G_n)$ is logically high, storage capacitor 16 is charged from the reference voltage level to the peak value of a source signal $V(S_m)$ transmitted via source line $S_m$. It is assumed that the source signal $V(S_m)$ is provided in line inversion or dot inversion. In driving an LCD device with line inversion, the polarity of a source signal is inverted every line of the gates during a frame time. In driving an LCD device with dot inversion, the polarity of a source signal is inverted every line of sources during a frame time. The source signal $V(S_m)$ and the gate signals $V(G_{n-1})$ and $V(G_n)$ are synchronized by a timing controller (not shown) of TFTLCD 10. When the selection period of the gate line $G_n$ is concluded and $V(G_n)$ becomes logically low, storage capacitor 16 is slightly discharged from the peak value due to a feed-through effect. A feed-through effect is a phenomenon that a voltage applied to a TFT is shifted to a negative polarity voltage when the TFT is turned off from the on state. If the feed-through voltage $\Delta V$ becomes great, there arises a problem that a remarkable image flicker occurs.

FIG. 2A is a schematic diagram of another $C_S$-on-gate type TFTLCD 30 in the art. An exemplary cell 32 of TFTLCD 30 includes a first TFT 34, a second TFT 38 and a storage capacitor 36. First TFT 34 includes a gate 34-2 coupled to an n-th gate line $G_n$, a drain terminal 34-4 coupled to an m-th source line $S_m$, and a source terminal 34-6 which serves as one electrode of storage capacitor 36. Second TFT 38 includes a gate 38-2 coupled to an (n-1)-th gate line $G_{n-1}$, a drain terminal 38-4 coupled to an m-th source line $S_m$, and a source terminal (not numbered) coupled to source terminal 34-6 of first TFT 34. The other electrode 36-2 of storage capacitor 36 is coupled to the gate line $G_{n-1}$. Cell 32 may further include another capacitor 40 formed between source terminal 34-6 and a common electrode (not numbered).

FIGS. 2B and 2C are waveform diagrams of TFTLCD 30 shown in FIG. 2A. Referring to FIG. 2C, when the gate line $G_{n-1}$ is selected and $V(G_{n-1})$ is logically high, the potential of source terminal 34-6 is pulled high from a reference voltage level, and then pulled low when second TFT 38 is turned on by the gate signal $V(G_{n-1})$. When the selection period of the gate line $G_{n-1}$ is concluded and $V(G_{n-1})$ becomes logically low, $V_{36}$ is pulled low to a negative voltage level. Next, when the gate line $G_n$ is selected and $V(G_n)$ is logically high, storage capacitor 36 is charged from the negative voltage level to the peak value of a source signal $V(S_m)$ transmitted via source line $S_m$. When the selection period of the gate line $G_n$ is concluded and $V(G_n)$ becomes logically low, storage capacitor 36 is slightly discharged from the peak value due to the feed-through effect. Referring to FIGS. 1B and 2B, it is more difficult to charge cell 32 than cell 12 of FIG. 1A in line inversion or dot inversion.

It is thus desirable to have a drive circuit and a drive method to alleviate the feed-through effect.

SUMMARY OF THE INVENTION

Accordingly, the present invention is directed to a drive circuit and a drive method for a thin film transistor liquid crystal display ("TFTLCD") device that obviate one or more of the problems due to limitations and disadvantages of the related art.

To achieve these and other advantages, and in accordance with the purpose of the invention as embodied and broadly described, there is provided a liquid crystal display device that comprises a plurality of gate lines formed in parallel to each other, a plurality of source lines formed in parallel to each other and orthogonal to the gate lines, an array of cells formed in rows and columns, each of the cells being formed near an intersection of one of the gate lines and one of the source lines, a first transistor of each of the cells disposed at an N-th row and M-th column, N and M being integers, driven by an (N-2)-th gate line, and a second transistor of the each of the cells driven by an N-th gate line.

In one aspect, each of the cells further comprises a first capacitor formed between an electrode and the (N-2)-th gate line, and a second capacitor formed between the electrode and an (N-1)-th gate line.

Also in accordance with the present invention, there is provided a liquid crystal display device that comprises a plurality of gate lines formed in parallel to each other, a plurality of source lines formed in parallel to each other and orthogonal to the gate lines, and an array of cells formed in rows and columns, each of the cells disposed near an intersection of an N-th gate line and an M-th source line, N and M being integers, further comprising a first capacitor formed between an electrode and an (N-2)-th gate line, and a second capacitor formed between the electrode and an (N-1)-th gate line.

In one aspect, the device further comprises a first transistor including a gate coupled to the (N-2)-th gate line, and a second transistor including a gate coupled to the N-th gate line.

Still in accordance with the present invention, there is provided a method of driving a liquid crystal display device that comprises providing a plurality of gate lines formed in parallel to each other, providing a plurality of source lines formed in parallel to each other and orthogonal to the gate lines, forming an array of cells in rows and columns, each of the cells being disposed near an intersection of an N-th gate line and an M-th source line, N and M being integers, forming a first transistor and a second transistor in the each of the cells, driving the first transistor through an (N-2)-th gate line, and driving the second transistor through the N-th gate line.

Yet still in accordance with the present invention, there is provided a method of driving a liquid crystal display device that comprises providing a plurality of gate lines formed in parallel to each other, providing a plurality of source lines formed in parallel to each other and orthogonal to the gate lines, forming an array of cells in rows and columns, each of the cells being disposed near an intersection of a corresponding N-th gate line and a corresponding M-th source line, N and M being integers, providing a signal including a first voltage level and a second voltage level from the M-th source line, selecting an (N-2)-th gate line, charging a first capacitor of each of the cells to a third voltage level between the first and the second voltage levels after a selection period of the (N-2)-th gate line, selecting an (N-1)-th gate line, keeping an electrical potential of a terminal of the first capacitor at the third voltage level after a selection period of the (N-1)-th gate line, selecting the N-th gate line, and charging the first capacitor to the first voltage level after a selection period of the N-th gate line from the third voltage level.

In one aspect, the method further comprises forming a first transistor and a second transistor in the each of the cells.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 3A:
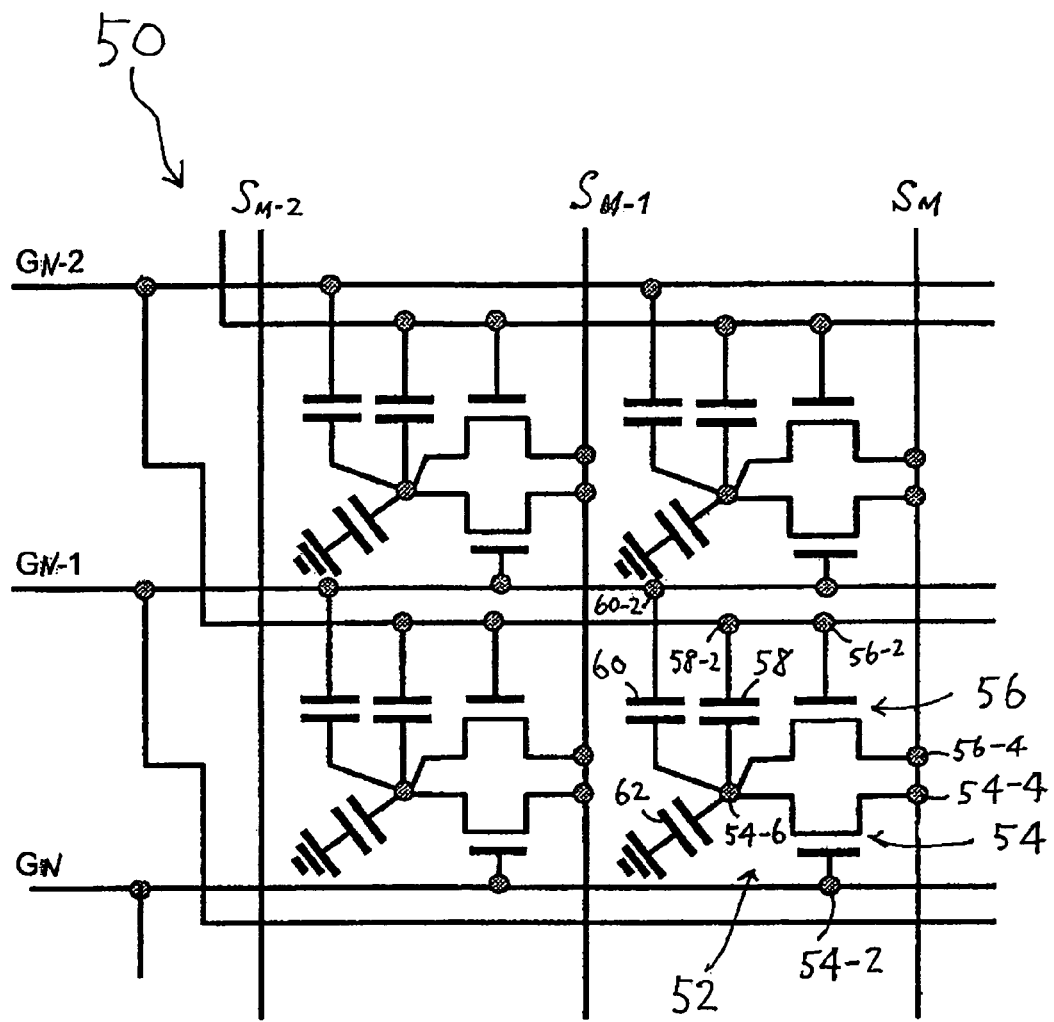
FIG. 3A is a schematic diagram of a TFTLCD in accordance with one embodiment of the present invention.

FIG. 3A is a schematic diagram of a thin film transistor liquid crystal display ("TFTLCD") device 50 in accordance with one embodiment of the present invention. TFTLCD device 50 includes a plurality of gate lines formed in parallel to each other, a plurality of source lines formed in parallel to each other and orthogonal to the gate lines, and an array of cells formed in rows and columns. Each of the cells is formed near an intersection of one of the gate lines and one of the source lines. For simplicity, only the gate lines $G_{N-2}$, $G_{N-1}$ and $G_N$, and the source lines $S_{M-2}$, $S_{M-1}$ and $S_M$ are shown.

Referring to FIG. 3A, an exemplary cell 52 includes a first transistor 54, second transistor 56, first capacitor 58, and second capacitor 60. First transistor 54 includes a gate 54-2 coupled to the gate line $G_N$, a drain terminal 54-4 coupled to the source line $S_M$, and a source terminal 54-6 which serves as one electrode of first capacitor 58 and second capacitor 60. Second transistor 56 includes a gate 56-2 coupled to the gate line $G_{N-2}$, a drain terminal 56-4 coupled to the source line $S_M$, and a source terminal (not numbered) coupled to source terminal 54-6 of first transistor 54. The other electrode 58-2 of first capacitor 58 is coupled to the gate line $G_{N-2}$. The other electrode 60-2 of second capacitor 60 is coupled to gate line $G_{N-1}$. Cell 52 may further include a third capacitor 62 formed between source terminal 54-6 and a common electrode (not numbered).

Figure 3B:
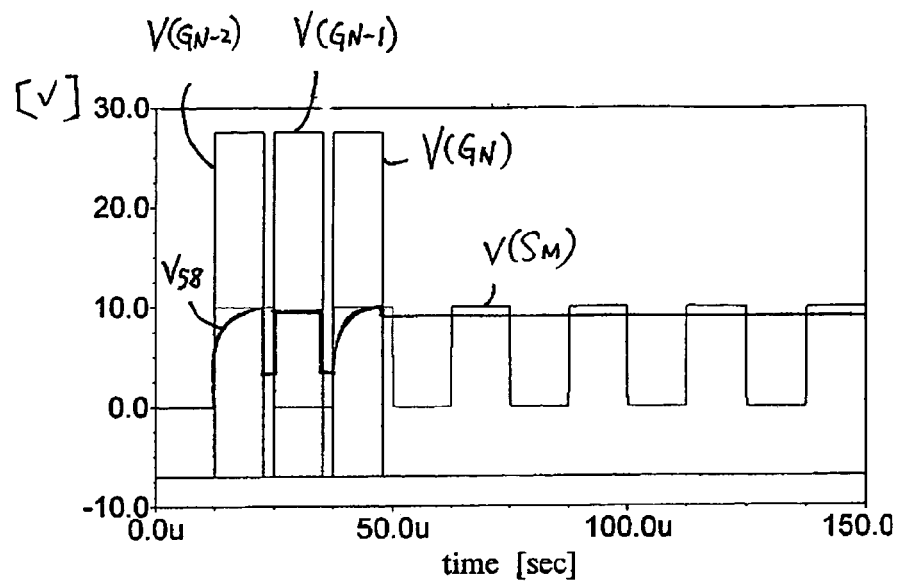
FIGS. 3B and 3C are waveform diagrams of the TFTLCD shown in FIG. 3A.
Figure 3C:
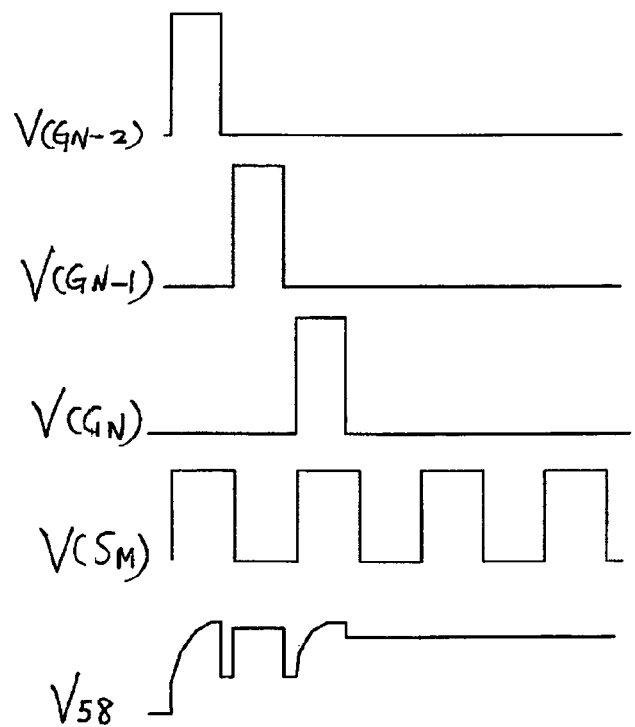

FIGS. 3B and 3C are waveform diagrams of TFTLCD device 50 shown in FIG. 3A, in which FIG. 3B shows waveform components together in a timing specification, and FIG. 3C shows the waveform components separately. Referring to FIG. 3C, when the gate line $G_{N-2}$ is selected, i.e., a corresponding gate line signal $V(G_{N-2})$ is logically high, gate 56-2 is driven by the high level signal $V(G_{N-2})$ to turn on second transistor 56. At this point, a first state, i.e., a logically high level, of a source signal $V(S_M)$ transmitted on the source line $S_M$ is written to first capacitor 58 and second capacitor 60 through drain terminal 56-4 of second transistor 56. As a result, the potential of the one electrode 54-6 or $V_{58}$ is charged to the first state of source signal $V(S_M)$ from a second state, i.e., a logically low level, of the source signal $V(S_M)$. When the selection period of the gate line $G_{N-2}$ is concluded, $V(G_{N-2})$ becomes logically low and second transistor 56 is turned off. $V_{58}$ is discharged to a third voltage level between the first and second states of the source signal $V(S_M)$.

Next, when the gate line $G_{N-1}$ is selected, i.e., a corresponding gate line signal $V(G_{N-1})$ is logically high, first transistor 54 and second transistor 56 are off and no source signals are written to first capacitor 58 or second capacitor 60. $V_{58}$ is pulled high from the second state to the first state. When the selection period of the gate line $G_{N-1}$ is concluded, $V_{58}$ is pulled low from the first state to the second state.

Next, when the gate line $G_N$ is selected, i.e., a corresponding gate line signal $V(G_N)$ is logically high, gate 54-2 is driven by the high level signal $V(G_N)$ to turn on first transistor 54. At this point, the first state of the source signal $V(S_M)$ is written to first capacitor 58 and second capacitor 60 through drain terminal 54-4 of first transistor 54. $V_{58}$ is charged to the first state from the second state. When the selection period of the gate line $G_N$ is concluded, $V(G_N)$ becomes logically low and first transistor 56 is turned off. $V_{58}$ is slightly discharged due to the feed-through effect.

Figure 1A:
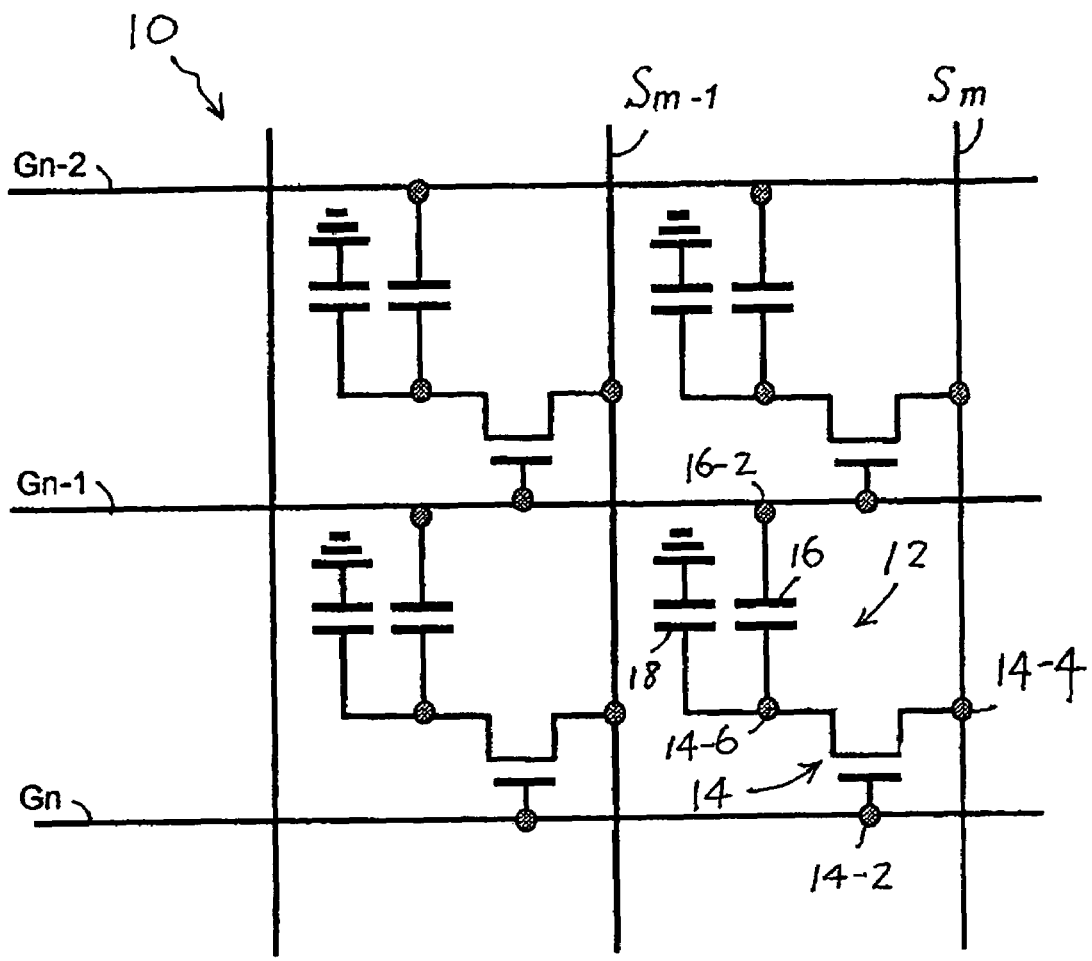
FIG. 1A is a schematic diagram of a $C_S$-on-gate type thin film transistor liquid crystal display ("TFTLCD") in the art.
Figure 1B:
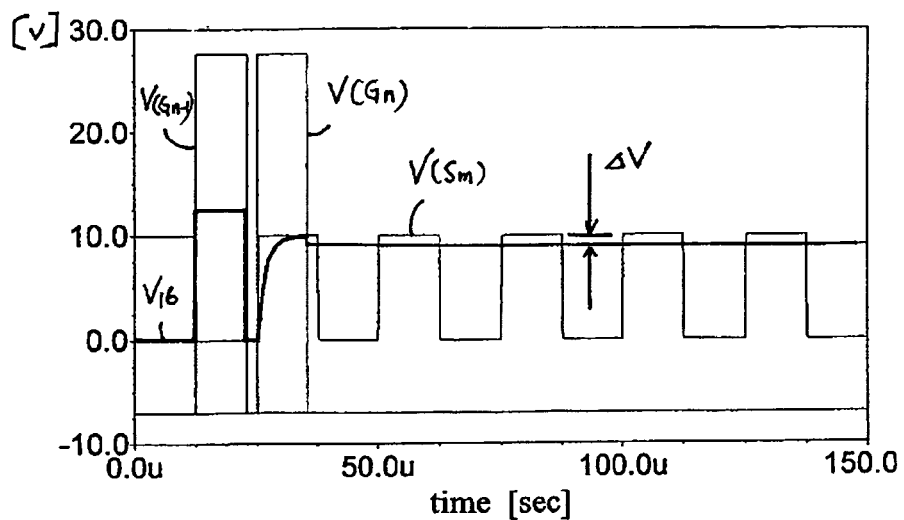
FIGS. 1B and 1C are waveform diagrams of the TFTLCD shown in FIG. 1A.
Figure 1C:
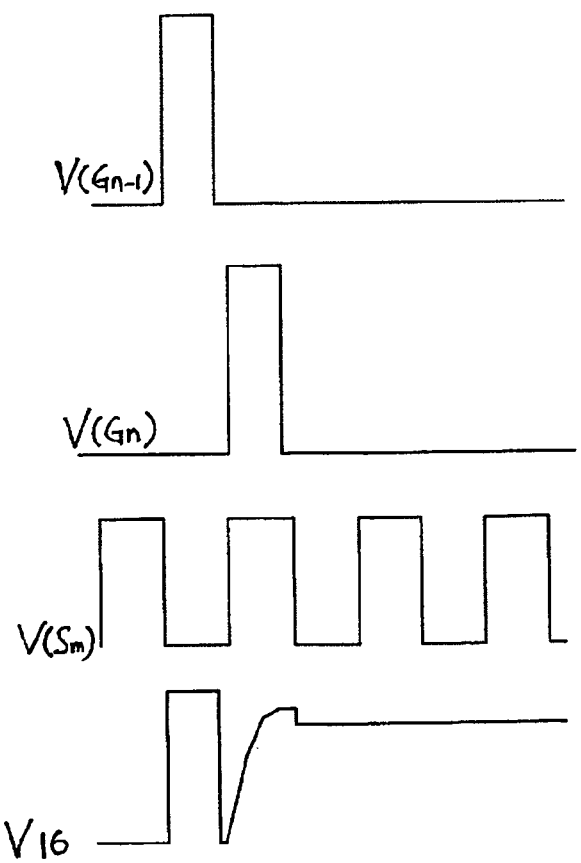
Figure 2A:
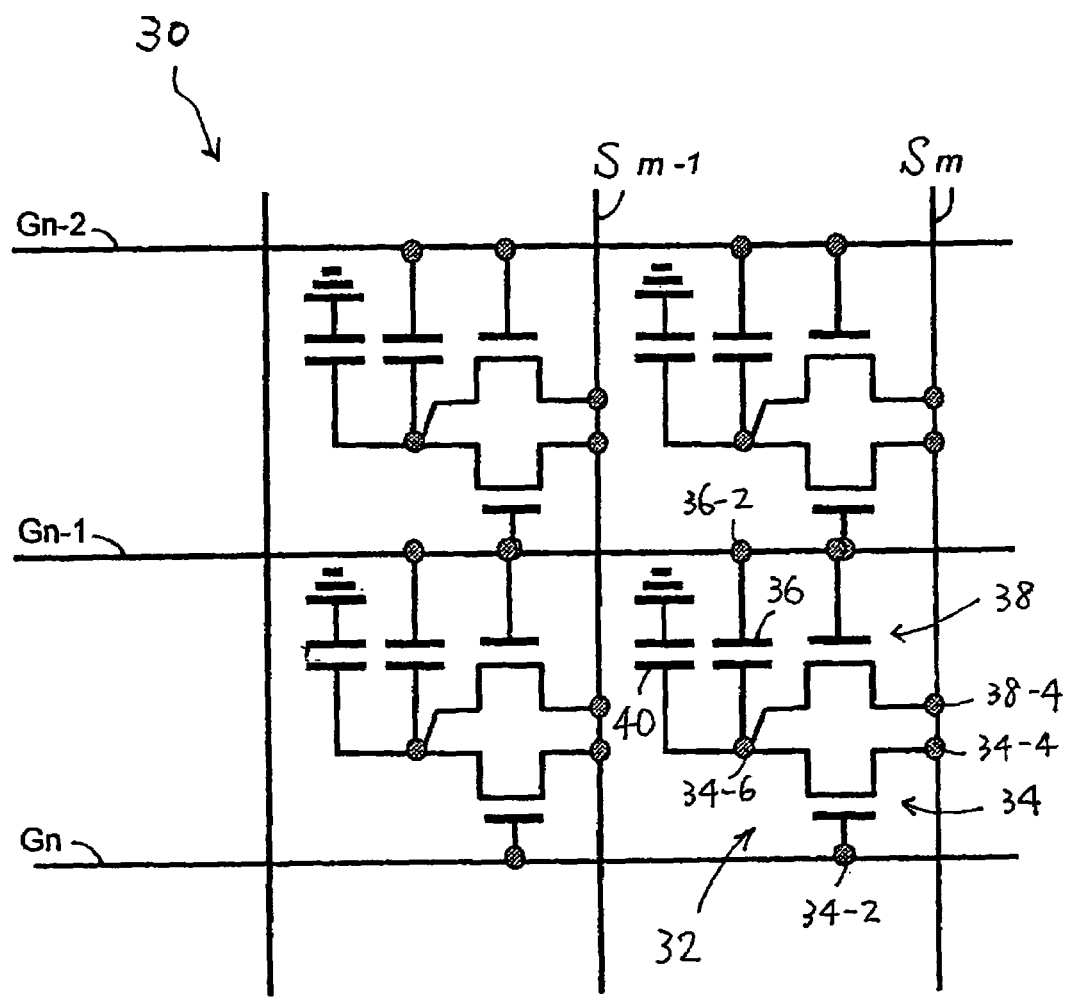
FIG. 2A is a schematic diagram of another $C_s$-on-gate type TFTLCD in the art.
Figure 2B:
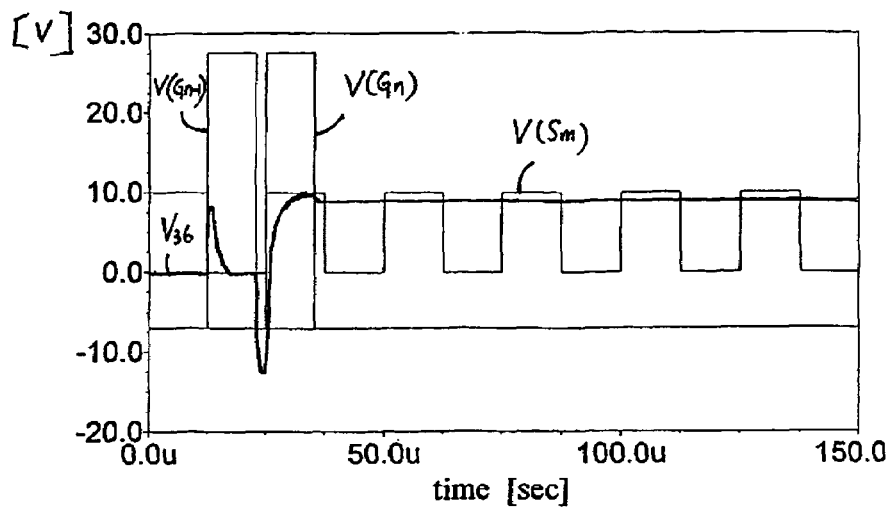
FIGS. 2B and 2C are waveform diagrams of the TFTLCD shown in FIG. 2A.
Figure 2C:
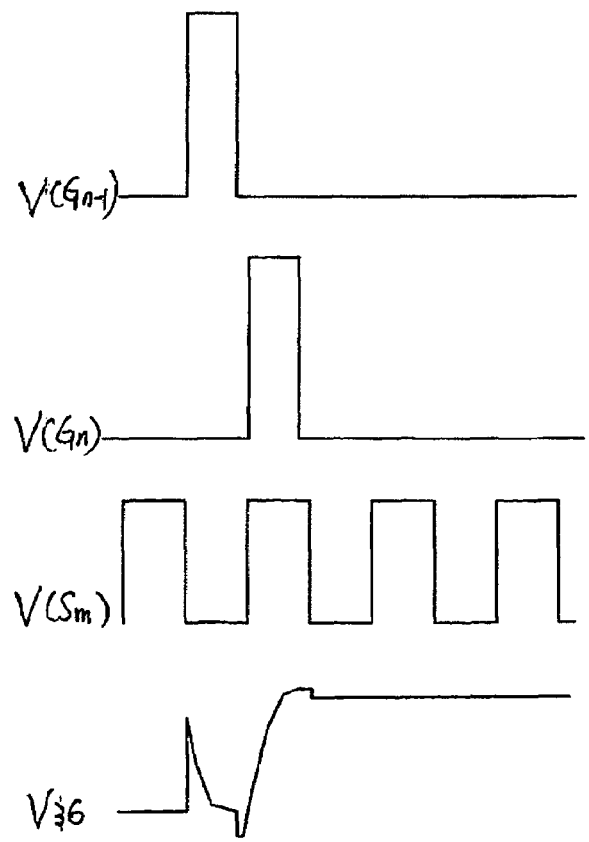
Figure 4:
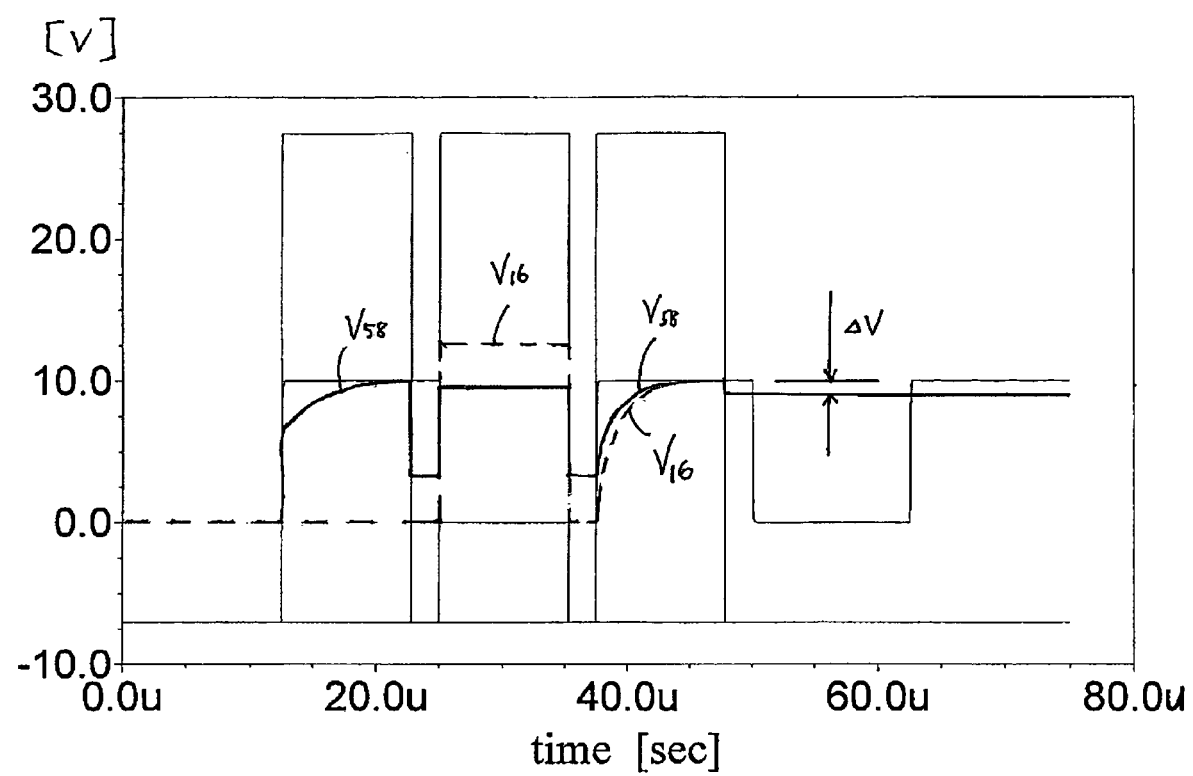
FIG. 4 is a diagram showing a comparison in charging ability between the TFTLCD device shown in FIG. 1A and that shown in FIG. 3A.

FIG. 4 is a diagram comparing the charging ability between TFTLCD device 10 shown in FIG. 1A and TFTLCD device 50 shown in FIG. 3A. Referring to FIG. 4, $V_{58}$ of TFTLCD device 50, shown in a solid line, is charged from the third state instead of the second state to the first state. As a result, $V_{58}$ of TFTLCD device 50 is charged to the first state faster than $V_{16}$ of TFTLCD device 10, shown in a dashed line. Given the same feed-through voltage $\Delta V$, TFTLCD device 50 advantageously alleviates the feed-through effect.

The present invention also provides a method for driving a liquid crystal display device. A plurality of gate lines including at least $G_{N-2}$, $G_{N-1}$ and $G_N$ formed in parallel to each other are provided. A plurality of source lines including at least $S_{M-2}$, $S_{M-1}$ and $S_M$ formed in parallel to each other and orthogonal to the gate lines are provided. An array of cells 12 formed in rows and columns are provided. Each of the cells 12 is disposed near an intersection of an N-th gate line and an M-th source line, N and M being integers. A first transistor 54 and a second transistor 56 are formed in the each of the cells 12. First transistor 54 is driven through an (N-2)-th gate line. Second transistor 56 is driven through the N-th gate line.

In one embodiment according to the present invention, a first capacitor 58 is formed between an electrode 54-6 and the (N-2)-th gate line, and a second capacitor 60 is formed between electrode 54-6 and an (N-1)-th gate line.

The present invention also provides another method for driving a liquid crystal display device. A plurality of gate lines including at least $G_{N-2}$, $G_{N-1}$ and $G_N$ formed in parallel to each other are provided. A plurality of source lines including at least $S_{M-2}$, $S_{M-1}$ and $S_M$ formed in parallel to each other and orthogonal to the gate lines are provided. An array of cells 12 formed in rows and columns are provided. Each of the cells 12 is disposed near an intersection of an N-th gate line and an M-th source line, N and M being integers. A signal $V(S_M)$ including a first voltage level and a second voltage level is provided from the M-th source line. The first and second voltage levels, for example, are logically high and logically low signals, respectively. An (N-2)-th gate line is selected. A first capacitor 58 of the each of the cells 12 is charged to a third voltage level between the first and second voltage levels after a selection period of the (N-2)-th gate line. An (N-1)-th gate line is next selected. The potential of a terminal 54-6 of first capacitor 58 is kept at the third voltage level after a selection period of the (N-1)-th gate line. The N-th gate line is next selected. First capacitor 58 is charged to the first voltage level from the third voltage level after a selection period of the N-th gate line.

In one embodiment according to the present invention, a first transistor 54 and a second transistor 56 are formed in the each of the cells 12. First transistor 54 is driven through the (N-2) gate line, and second transistor 56 is driven through the N-th gate line.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display device comprising:
   a plurality of gate lines formed in parallel to each other;
   a plurality of source lines formed in parallel to each other and orthogonal to the gate lines;
   an array of cells formed in rows and columns, each of the cells being formed near an intersection of one of the gate lines and one of the source lines;
   a first transistor of each of the cells disposed at an N-th row and M-th column, N and M being integers, driven by an (N-2)-th gate line, wherein the first transistor includes a gate coupled to the (N-2)-th gate line, a first terminal directly connected to an electrode, and a second terminal coupled to the M-th source line;
   a second transistor of the each of the cells driven by an N-th gate line, wherein the second transistor includes a gate coupled to the N-th gate line, a first terminal directly connected to the electrode, and a second terminal coupled to the M-th source line; and
   a first capacitor of each of the cells formed between the electrode and the (N-2)-th gate line.

2. The device of claim 1, each of the cells further comprising a second capacitor formed between an electrode and an (N-1)-th gate line.

3. The device of claim 2, the first capacitor being charged to a first voltage level in response to a fist state of a signal transmitted on the (N-2)-th gate line, and being discharged to a second voltage level in response to a second state of the signal transmitted on the (N-2)-th gate line.

4. The device of claim 3, an electrical potential at the electrode being pulled up to a third voltage level in response to a first state of a signal transmitted on the (N-1)-th gate line, and being pulled down to the second voltage level in response to a second state of the signal transmitted on the (N-1)-th gate line.

5. The device of claim 4, the first capacitor being charged from the second voltage level to the first voltage level in response to a first state of a signal transmitted on the N-th gate line.

6. A liquid crystal display device comprising:
   a plurality of gate lines formed in parallel to each other;
   a plurality of source lines formed in parallel to each other and orthogonal to the gate lines; and
   an array of cells formed in rows and columns, each of the cells disposed near an intersection of an N-th gate line and an M-th source line, N and M being integers, further comprising:
   a first capacitor formed between an electrode and an (N-2)-th gate line;
   a second capacitor formed between the electrode and an (N-1)-th gate line;
   a first transistor including a gate coupled to the (N-2)-th gate line, a first terminal directly connected to the electrode, and a second terminal coupled to the M-th source line; and
   a second transistor including a gate coupled to the N-th gate line, a first terminal directly connected to the electrode, and a second terminal coupled to the M-th source line.

7. The device of claim 6 wherein a signal transmitted on the M-th source line includes a first voltage level and a second voltage level.

8. The device of claim 7, the first capacitor being charged to a third voltage level between the first and second voltage levels after a selection period of the (N-2)-th gate line.

9. The device of claim 7, an electrical potential of the electrode being kept at a third voltage level between the first and second voltage levels after a selection period of the (N-1)-th gate line.

10. The device of claim 7, the first capacitor being charged to the first voltage level after a selection period of the N-th gate line from a third voltage level between the first and second voltage levels.

11. A method of driving a liquid crystal display device comprising:
providing a plurality of gate lines formed in parallel to each other;
providing a plurality of source lines formed in parallel to each other and orthogonal to the gate lines;
forming an array of cells in rows and columns, each of the cells being disposed near an intersection of an N-th gate line and an M-th source line, N and M being integers;
forming a first transistor and a second transistor in the each of the cells;
forming a first capacitor between an electrode and an (N-2)-th gate line in the each of the cells;
driving the first transistor through the (N-2)-th gate line; and
driving the second transistor through the N-th gate line, wherein the first transistor includes a gate coupled to the (N-2)-th gate line, a first terminal directly connected to the electrode, and a second terminal coupled to the M-th source line and wherein the second transistor includes a gate coupled to the N-th gate line, a first terminal directly connected to the electrode, and a second terminal coupled to the M-th source line.

12. The method of claim 11 further comprising forming a second capacitor between the electrode and an (N-1)-th gate line in the each of the cells.

13. The method of claim 12 further comprising providing a signal including a first voltage level and a second voltage level from the M-th source line to the first and second transistors.

14. The method of claim 13 further comprising selecting the (N-2)-th gate line, and charging the first capacitor to a third voltage level between the first and second voltage levels after a selection period of the (N-2)-th gate line.

15. The method of claim 13 further comprising selecting the (N-1)-th gate line, and keeping an electrical potential of the electrode at a third voltage level between the first and second voltage levels after a selection period of the (N-1)-th gate line.

16. The method of claim 13 further comprising selecting the N-th gate line, and charging the first capacitor to the first voltage level after a selection period of the N-th gate line from a third voltage level between the first and second voltage levels.

17. A method of driving a liquid crystal display device comprising:
providing a plurality of gate lines formed in parallel to each other;
providing a plurality of source lines formed in parallel to each other and orthogonal to the gate lines;
forming an array of cells in rows and columns, each of the cells being disposed near an intersection of a corresponding N-th gate line and a corresponding M-th source line, N and M being integers;
providing a signal including a first voltage level and a second voltage level from the M-th source line;
selecting an (N-2)-th gate line;
charging a first capacitor of the each of the cells to a third voltage level between the first and second voltage levels after a selection period of the (N-2)-th gate line;
selecting an (N-1)-th gate line;
keeping an electrical potential of a terminal of the first capacitor at the third voltage level after a selection period of the (N-1)-th gate line;
selecting the N-th gate line;
charging the first capacitor to the first voltage level after a selection period of the N-th gate line from the third voltage; and
forming a first transistor and a second transistor in the each of the cells, wherein the first transistor includes a gate coupled to the (N-2)-th gate line, a first terminal directly connected to the terminal of the first capacitor, and a second terminal coupled to the M-th source line and wherein the second transistor includes a gate coupled to the N-th gate line, a first terminal directly connected to the terminal of the first capacitor, and a second terminal coupled to the M-th source line.

18. The method of claim 17 further comprising driving the first transistor through the (N-2) gate line.

19. The method of claim 17 further comprising driving the second transistor through the N-th gate line.

* * * * *